(12) United States Patent
Ikeda et al.

(10) Patent No.: US 10,344,661 B2
(45) Date of Patent: Jul. 9, 2019

(54) ENGINE SYSTEM (71) Applicant: YANMAR CO., LTD., Osaka-shi (JP)

(72) Inventors: Tomoyuki Ikeda, Osaka (JP); Satoshi Abe, Osaka (JP); Yosuke Tahara, Osaka (JP)

(73) Assignee: YANMAR CO., LTD., Osaka (JP)

(*) Notice: Subject to any disclaimer, the term of this patent is extended or adjusted under 35 U.S.C. 154(b) by 213 days.

(21) Appl. No.: 14/809,426

(22) Filed: Jul. 27, 2015

(65) Prior Publication Data
US 2016/0090893 A1 Mar. 31, 2016

(30) Foreign Application Priority Data

Aug. 5, 2014 (JP) ................................ 2014-159294

(51) Int. Cl.
| | | |
|---|---|---|
| F01P 3/18 | (2006.01) |
| F02B 63/04 | (2006.01) |
| F02B 63/06 | (2006.01) |
| F02N 11/08 | (2006.01) |
| F01P 1/06 | (2006.01) |
| F02N 15/00 | (2006.01) |

(52) U.S. Cl.
CPC .............. F01P 3/18 (2013.01); F01P 1/06 (2013.01); F02B 63/044 (2013.01); F02B 63/06 (2013.01); F02N 11/0862 (2013.01); F02B 2063/045 (2013.01); F02N 11/0803 (2013.01); F02N 15/006 (2013.01); Y02E 20/14 (2013.01)

(58) Field of Classification Search
CPC ............................ B60H 1/00278; H02K 19/36
See application file for complete search history.

(56) References Cited

U.S. PATENT DOCUMENTS

| | | |
|---|---|---|
| 3,566,142 A | 2/1971 | Dabell |
| 4,951,871 A | 8/1990 | Hata et al. |
| | (Continued) | |

FOREIGN PATENT DOCUMENTS

| | | |
|---|---|---|
| JP | 1989-056526 U | 4/1989 |
| JP | 04-054226 A | 2/1992 |
| | (Continued) | |

OTHER PUBLICATIONS

Hibi, JP2002242759 translation, "Structure of cogeneration apparatus", Aug. 28, 2002.*

(Continued)

*Primary Examiner* — Vivek K Shirsat
*Assistant Examiner* — Ryan Faulkner
(74) *Attorney, Agent, or Firm* — Norton Rose Fulbright US LLP (57) ABSTRACT

A radiator chamber is provided in a top compartment of a package, whereas an engine is provided in a bottom compartment. Outside the package, a battery unit is attached to an external wall panel (e.g., lower panel) of the bottom compartment. The battery unit includes a dedicated unit ventilation fan and a unit ventilating section that introduces outside air into an enclosure of the battery unit. The enclosure has a lower portion thereof divided to accommodate a package ventilating section that ventilates the bottom compartment of the package. There is provided a detachable bottom compartment inspection window in the external wall panel below the battery unit.

14 Claims, 7 Drawing Sheets

(56) References Cited

U.S. PATENT DOCUMENTS

| | | |
|---|---|---|
| 8,360,014 B2 | 1/2013 | Ono et al. |
| 8,890,340 B2 | 11/2014 | Honkanen et al. |
| 8,960,708 B2 | 2/2015 | Ziebert et al. |
| 8,963,348 B2 | 2/2015 | Kawakita et al. |
| 2006/0054113 A1 | 3/2006 | Yasuda et al. |
| 2007/0296223 A1 | 12/2007 | Saylor |
| 2010/0072757 A1 | 3/2010 | Kealy et al. |
| 2011/0000407 A1 | 1/2011 | Bassett |
| 2011/0057454 A1 | 3/2011 | Kawakita et al. |
| 2012/0146465 A1* | 6/2012 | Kawakita ............... F02B 63/04 310/68 D |
| 2012/0187679 A1 | 7/2012 | Takita et al. |
| 2015/0292435 A1 | 10/2015 | Yamanaka et al. |

FOREIGN PATENT DOCUMENTS

| | | | |
|---|---|---|---|
| JP | H06-012730 U | 2/1994 | |
| JP | H07-305872 A | 11/1995 | |
| JP | 08-014697 A | 1/1996 | |
| JP | H08-014693 A | 1/1996 | |
| JP | 2739186 B | 4/1998 | |
| JP | 2001-116296 A | 4/2001 | |
| JP | 2002242759 * | 8/2002 | ............ F02B 63/04 |
| JP | 3345627 B2 | 11/2002 | |
| JP | 3656141 B | 6/2005 | |
| JP | 2007-104737 A | 4/2007 | |
| JP | 2009-168420 A | 7/2009 | |
| JP | 2009-270488 A | 11/2009 | |
| JP | 2012-036800 A | 2/2012 | |
| JP | 4870408 B2 | 2/2012 | |
| WO | 2015/146343 A1 | 10/2015 | |

OTHER PUBLICATIONS

Hibi, JP2002242759, Structure of cogeneration apparatus, Aug. 28, 2002.*

* cited by examiner

ENGINE SYSTEM

CROSS REFERENCE TO RELATED APPLICATIONS

This application is related to three co-pending applications: "ENGINE SYSTEM" filed even date herewith in the names of Tomoyuki Ikeda, Satoshi Abe, and Yosuke Tahara, which claims priority to Japanese Application No. 2014-159293, filed Aug. 5, 2014; "ENGINE SYSTEM" filed even date herewith in the names of Susumu Murai, Akihiro Nagao and Hiroyuki Okada, which claims priority to Japanese Application No. 2014-159295, filed Aug. 5, 2014; and "ENGINE SYSTEM" filed even date herewith in the names of Susumu Murai, Akihiro Nagao and Hiroyuki Okada, which claims priority to Japanese Application No. 2014-159296, filed Aug. 5, 2014; which applications are assigned to the assignee of the present application and all three incorporated by reference herein.

CROSS-REFERENCE TO RELATED APPLICATION (FOR U.S. APPLICATION ONLY)

The present application hereby claims priority under 35 U.S.C. § 119 on Japanese Patent Application, Tokugan, No. 2014-159294 filed Aug. 5, 2014 in Japan, the entire contents of which are hereby incorporated herein by reference.

BACKGROUND OF INVENTION

Technical Field of Invention

The present invention relates in general to engine electric power generators and other like engine systems containing an engine and a work machine (e.g., electric power generator or compressor) powered by the engine in a single package and in particular to structures for installing an engine starting battery unit in the package.

Related Technology

Conventionally, hospitals, factories, and like facilities are equipped with a system that is connected to an electric power generator powered by an engine via an inverter for emergency electric power, as well as to a commercial electric power system for an external commercial power supply, to meet the demand for electric power in case of a power failure. It is also known to build such a system as a cogeneration device that recovers waste heat generated in electric power generation for later use.

Patent Document 1 (Japanese Patent No. 4870408), as an example, discloses a structure of an electric power supply device that houses an engine and an electric power generator in a single package. The electric power supply device includes an automatic startup device with a built-in engine starting battery. The automatic startup device is disposed inside the package in such a fashion that it is detachable. This attachable/detachable structure of the automatic startup device allows the use of a common manufacturing line and the increased use of common components for both those models that are capable of automatic startup in case of a power failure ("power failure response enabled devices") and those that do not automatically start up ("standard devices"), which in turn reduces cost.

SUMMARY OF INVENTION

However, inside the package for a standard device in which no automatic startup device is installed, an empty space is left unused that was set aside to accommodate an automatic startup device for the power failure response enabled device. In addition, the built-in battery for the automatic startup device is bulky. The conventional example standard device therefore disadvantageously contains large wasted space in the package.

In view of these issues, the present invention includes an external battery unit attached outside a package for an engine system and has an object of providing a suitable structure for the package and the external battery unit.

The present invention, conceived to achieve the object, is an engine system containing an engine and a work machine in a single package. The package has an internal space thereof divided into a top compartment and a bottom compartment. The top compartment contains a radiator chamber accommodating a radiator and a radiator fan. The bottom compartment contains the engine. The bottom compartment having an external wall panel onto which a battery unit housing a battery and a charger is attached outside the package. The battery unit includes a dedicated ventilation fan and a unit ventilating section that introduces outside air into an enclosure of the battery unit when the ventilation fan operates. The enclosure has a lower portion thereof divided to accommodate a package ventilating section that ventilates the bottom compartment of the package.

Moreover, the package ventilating section introduces outside air through an outside air inlet provided in a bottom face of the enclosure and passes the outside air through an outside air outlet provided in a side face of the enclosure, to deliver the outside air to the bottom compartment through a vent provided in the external wall panel. There is also provided a detachable bottom compartment inspection window in the external wall panel below the battery unit.

The engine system in accordance with the present invention, first of all, having a battery unit attached outside the package, no longer requires any space inside the package to accommodate the battery unit. The engine system leaves no wasted battery space in the package of the power failure response disabled model (standard device). The battery unit is attached externally to the external wall panel of the bottom compartment of the package in order to lower the center of mass of the entire package.

The provision of the battery unit outside the package makes it difficult to cool the battery by a fan or like device disposed inside the package. In the structure described above, there is provided a dedicated ventilation fan to the battery unit, and a unit ventilating section introduces outside air into the enclosure. The structure cools the battery in a suitable manner.

The battery unit attached outside the package however covers a part of the external wall panel of the package. No vent or like structural member can be provided in the area covered by the battery unit. That could constrain freedom in designing ventilation paths inside the package. In addition, to remove the external wall panel onto which the battery unit is externally attached, the heavy battery unit should be removed together, which makes the procedures more difficult to perform.

These issues are addressed by the structure by providing the battery unit with a package ventilating section so that a vent may be provided in the area of the external wall panel of the package that is covered by the battery unit. Ventilation air (outside air) can be passed into the package through the vent and the package ventilating section. Freedom would not be constrained in designing ventilation paths inside the package.

The detachable bottom compartment inspection window, provided in the external wall panel below the battery unit, can be removed to perform some maintenance work without having to remove, for example, the external wall panel or the battery unit. That facilitates the maintenance work.

The "maintenance work" includes, for example, maintenance work performed on a drain water filter. More specifically, the condensed water (drain water) separated out of the exhaust of the engine is generally acidic. The drain water filter is provided to neutralize the acidic condensed water. The neutralizing agent requires regular supplementation or replacement. Accordingly, the drain water filter is disposed in the bottom compartment of the package near the bottom compartment inspection window so that the neutralizing agent can be readily supplemented or replaced by simply removing the bottom compartment inspection window.

DESCRIPTION OF EMBODIMENTS

The following will describe embodiments of the present invention in reference to drawings.

The present embodiment is an application of an energy system in accordance with the present invention to a cogeneration device 1. The cogeneration device 1 is a system that connects both an external commercial power supply from a commercial electric power system and an electric power supply from an electric power generator (via an inverter) to an electric power supply system for an electric power consuming device (load), to meet the demand for electric power by the load and that also recovers waste heat generated in power generation for later use.

Figure 1:
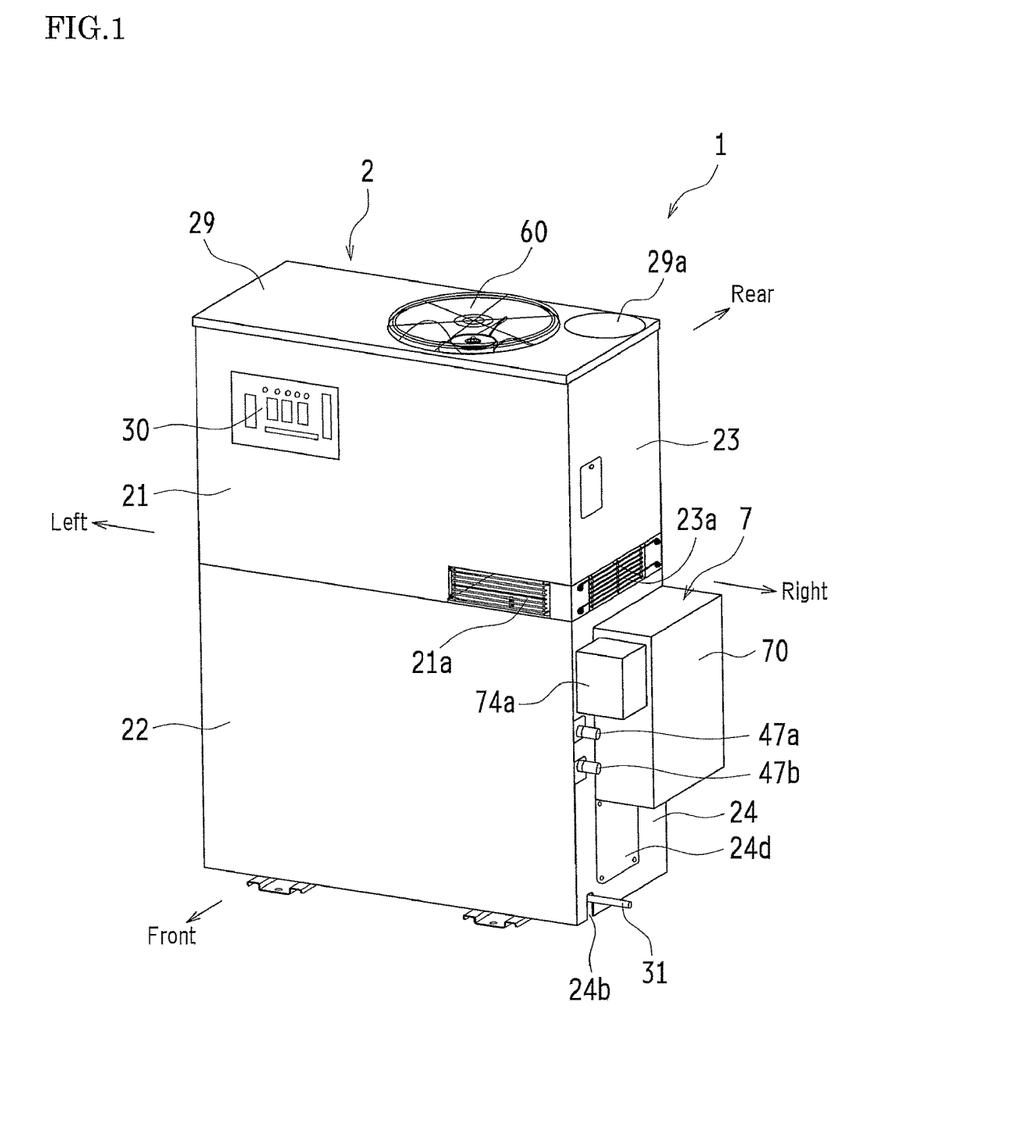
FIG. 1 is an oblique view of a cogeneration device (power failure response enabled model) in accordance with an embodiment of the present invention, as viewed obliquely downward from the front.
Figure 2:
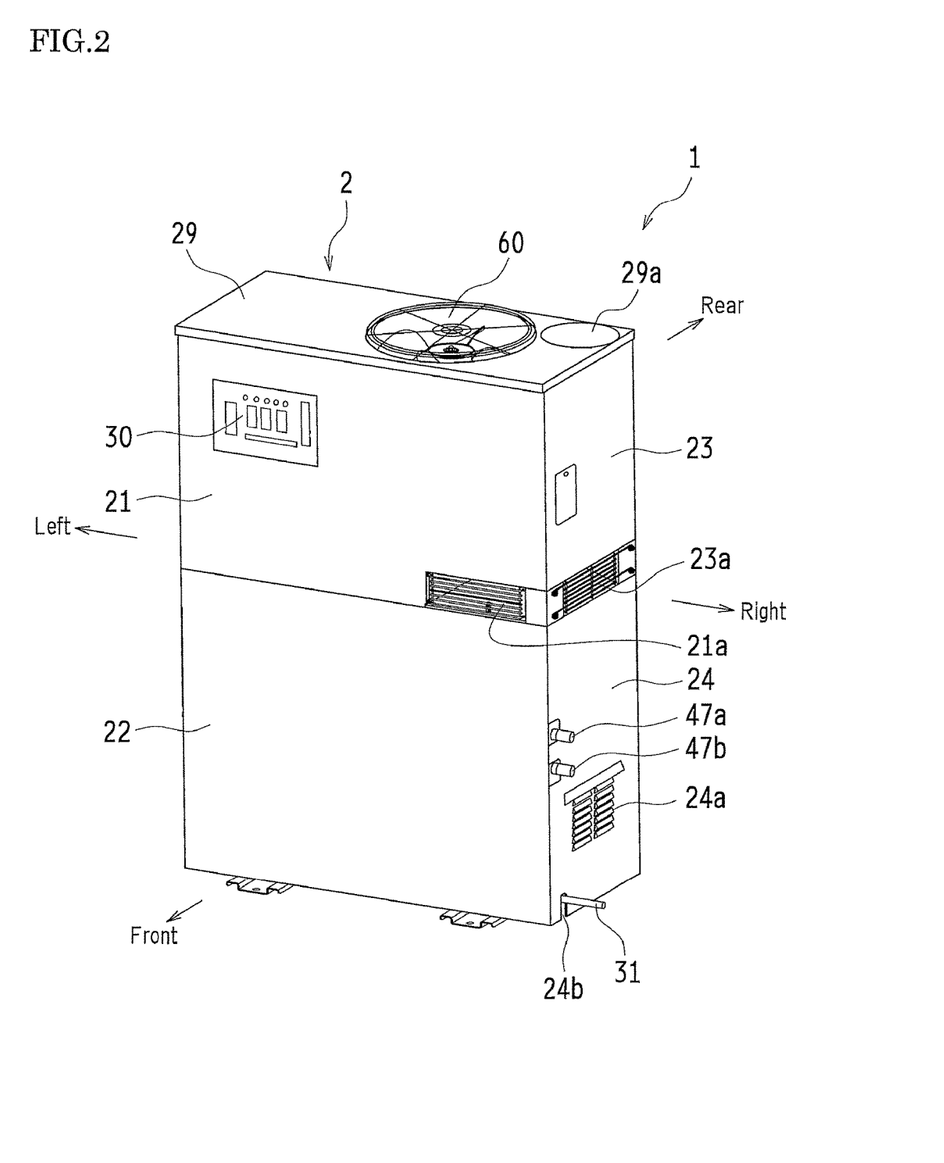
FIG. 2 is an oblique view of a standard model version of the cogeneration device shown in FIG. 1
Figure 3:
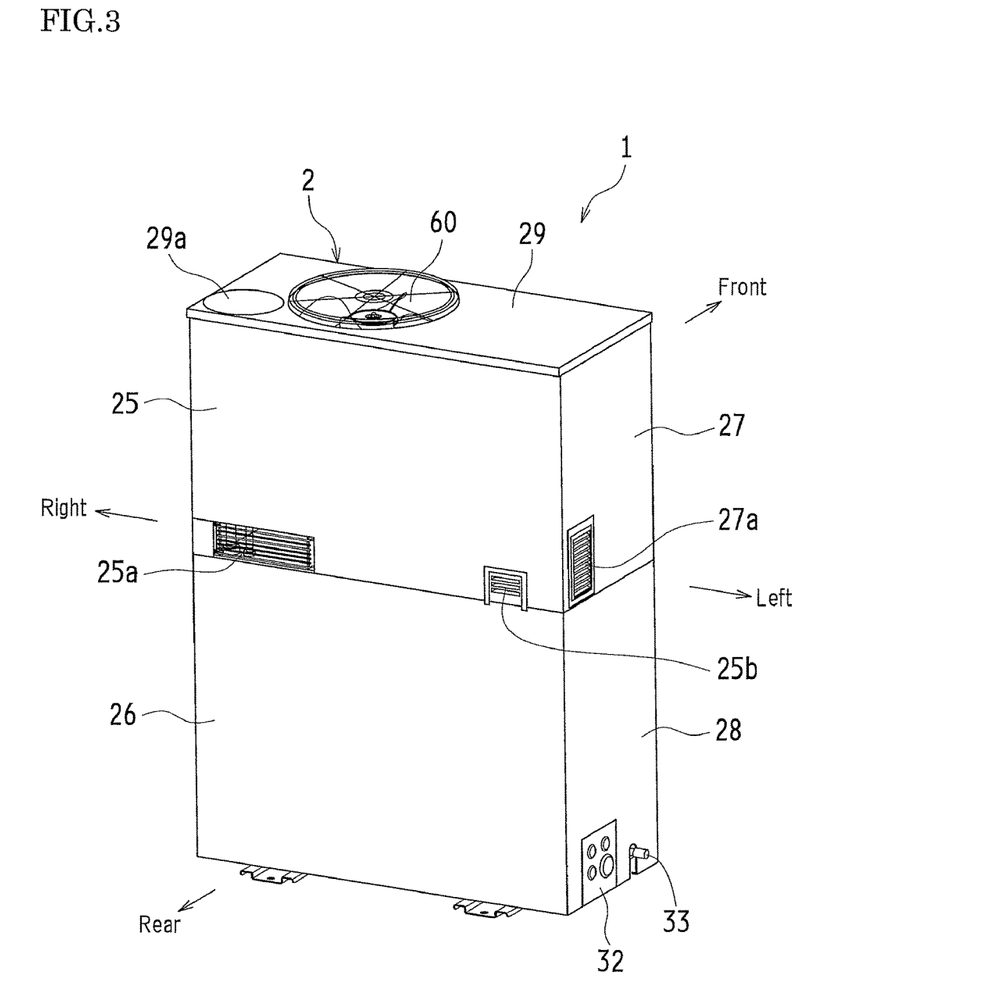
FIG. 3 is an oblique view of the standard model device shown in FIG. 2 as viewed from the rear.

FIGS. 1 and 2 are oblique views of the cogeneration device 1 as viewed from the front. FIG. 1 shows a power failure response enabled device that automatically starts up in case of a power failure of the commercial electric power system to start electric power generation. FIG. 2 shows a standard device that does not automatically start up. FIG. 3 is an oblique view of the standard device as viewed from the rear. Referring to FIG. 1, a battery unit 7 is attached outside a package 2 that houses the power failure response enabled device. Apart from this, the standard device and the power failure response enabled device share a common basic structure; common members are denoted by the same reference numerals.

Figure 4:
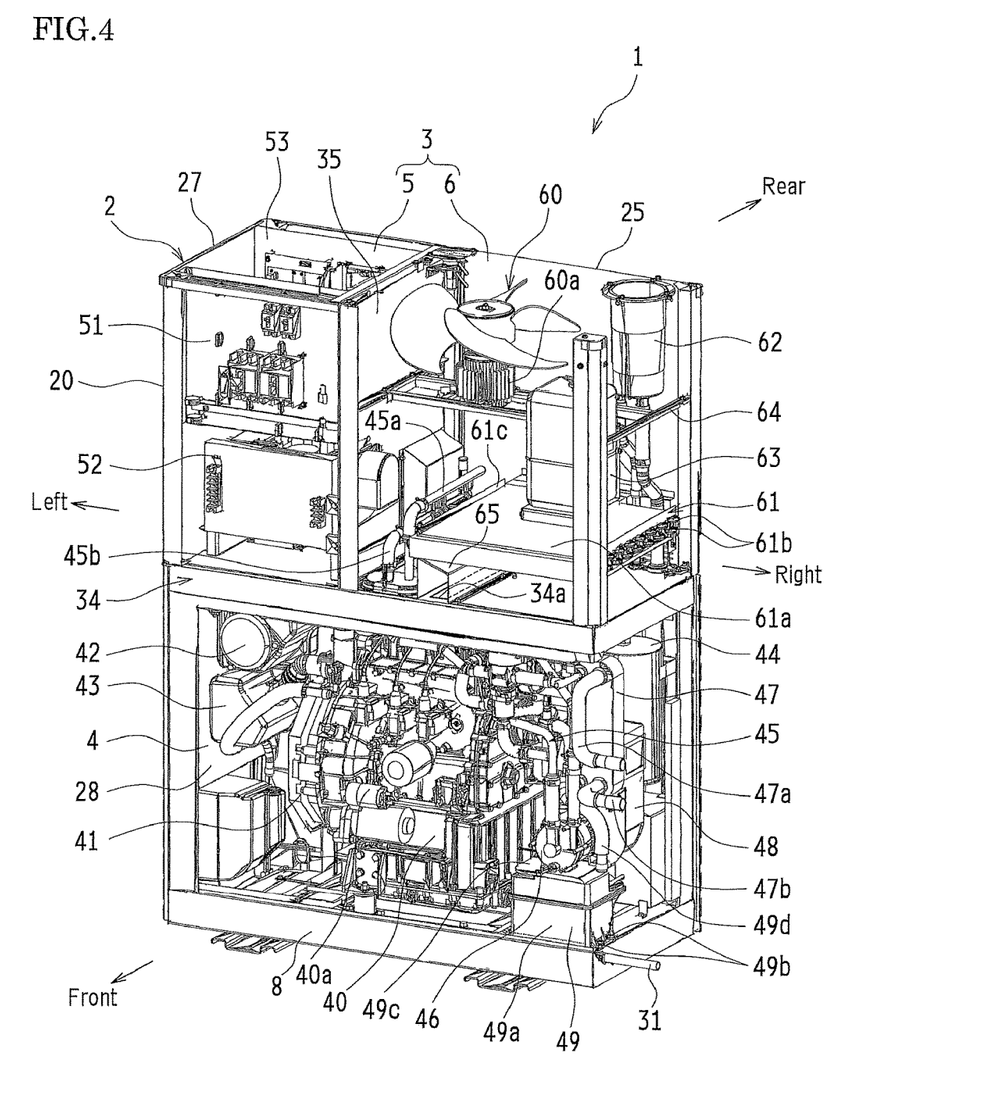
FIG. 4 is an oblique view of the standard model device shown in FIG. 2, illustrating the structure of the standard model device by removing parts of its package.

The following will first describe a standard device primarily in reference to FIGS. 2 to 4. As shown in FIGS. 2 and 3, the cogeneration device 1 in accordance with the present embodiment includes the package 2 as an enclosure shaped substantially like a vertically elongated rectangular parallelepiped. The package 2, in this example, has a greater dimension in the left/right direction (width) than in the front/rear direction (depth). Throughout the rest of the description, the left-hand side in FIG. 2 will be simply referred to as the left-hand side, and the right-hand side in FIG. 2 will likewise be simply referred to as the right-hand side.

More specifically, the package 2 in accordance with the present embodiment includes a frame 20 (see FIG. 4) and a plurality of panels 21 to 29. The frame 20 is composed of a steel-based material and has a rectangular base 8 (see FIG. 4) as a base component. The panels 21 to 29 are attached to the frame 20 in such a manner that the panels 21 to 29 are individually detachable. In other words, as shown in FIG. 2, the front face of the package 2 is divided into two (i.e., upper and lower) panels 21 and 22. The right face of the package 2 is also divided into two (i.e., upper and lower) panels 23 and 24.

Likewise, as shown in FIG. 3, the rear face of the package 2 is also divided into two (i.e., upper and lower) panels 25 and 26. The left face of the package 2 is also divided into two (i.e., upper and lower) panels 27 and 28. Meanwhile, the top face of the package 2 is a single-piece top face panel 29 in which there are provided, for example, a radiator fan 60 and an engine exhaust port 29a (detailed later).

A control panel 30 is provided near the upper left corner of the upper panel 21 on the package's front face. A radiator vent 21a is provided in a right bottom part of the upper panel 21. Another radiator vent 23a is provided in a bottom part of the upper panel 23 on the package's right face. An engine ventilation gallery 24a is provided in a lower part of the lower panel 24 on the package's right face. A notch section 24b is cut out on the bottom end of the lower panel 24, close to the front. A drain hose 31 is run through the notch section 24b.

Near the right bottom corner of the upper panel 25 on the package's rear face, opposite the radiator vent 21a in the upper panel 21 on the package's front face, is there provided a like radiator vent 25a. Near the left bottom corner of the upper panel 25 is there provided an engine air intake gallery 25b. A gallery 27a is provided in a bottom part of the upper panel 27 on the package's left face, close to the rear, to introduce an inverter-cooling air flow. A power supply connector 32 and a gas supply tap 33 are provided in a bottom part of the lower panel 28 on the package's left face.

As illustrated in FIG. 4 by partially omitting the panels 21 to 29, the frame 20, and some other structural members, the internal space of the package 2 is divided into two upper and lower portions by a midlevel wall 34 located substantially halfway up from the bottom. The upper portion contains a top compartment 3, whereas the lower portion contains a bottom compartment 4. The top compartment 3 is divided by a partition wall 35 into left and right portions. The left portion contains a device installation chamber 5, whereas the right portion contains a radiator chamber 6.

An engine 40 and an electric power generator 41 that is powered by the engine 40 are disposed substantially at the center of the bottom compartment 4. In the left-hand side of the bottom compartment 4 are there provided an air cleaner 42, an intake air silencer 43, and other air intake system components for the engine 40. Meanwhile, an exhaust system is disposed on the rear of the engine 40. An exhaust silencer 44, connected to an exhaust manifold (not shown), is disposed in the right-hand side of the bottom compartment 4, close to the rear. As an example, the engine 40 may be a gas engine.

A cooling water circuit 45 is disposed in the right-hand side of the bottom compartment 4, close to the front, so as to cool the engine 40 during operation and recover waste heat. The cooling water circuit 45 connects a water jacket of the engine 40 to a radiator 61 (detailed later) to circulate cooling water by a cooling water pump 46 and recover exhaust heat by an exhaust gas heat exchanger (not shown).

The waste heat thus recovered may be reused by a water/water heat exchanger 47 as a heat source for a water heater or like system that is out of the view. The water/water heat exchanger 47 is connected to the cooling water circuit 45. More specifically, a water supply tube 47a and a waste water tube 47b, both connected to the water/water heat exchanger 47, extend through the lower panel 24 on the package's right face and project out of the package 2 as illustrated in FIG. 2, so that piping from, for example, a water heater can be connected to the water supply tube 47a and the waste water tube 47b.

An air intake fan 48 is disposed so as to be interposed between the cooling water circuit 45 and the exhaust silencer 44, to draw outside air into the bottom compartment 4 for ventilation. The air intake fan 48 operates in synchronism with the cooling water pump 46. The air intake fan 48 draws outside air through the gallery 24a in the lower panel 24 on the package's right face and through an air intake duct (not shown) and blows out the air at the bottom of the bottom compartment 4.

A drain water filter 49 is disposed in the right-hand side of the bottom compartment 4, close to its front lower part, below the cooling water circuit 45 and the cooling water pump 46. The drain water filter 49 recovers condensed water (drain water) separated out of the exhaust of the engine 40 in a mist separator 62 (detailed later) and neutralizes this acid drain water by a neutralizing agent. The neutralized drain water is discharged from the package through the drain hose 31.

While the lower portion of the package 2 contains the bottom compartment 4 alone as mentioned above, the top compartment 3, located above the midlevel wall 34, is divided into the device installation chamber 5 and the radiator chamber 6 as mentioned above. The left one of the chambers, or the device installation chamber 5, contains electric components to control the engine 40 and the electric power generator 41. Circuit boards 51 to 53 shown, for example, in FIG. 4 carry thereon a control circuit for the engine 40, a control circuit for an electromagnetic valve and other components of the cooling water circuit 45, and a control circuit for, among others, the cooling water pump 46, the radiator fan 60, and the air intake fan 48 respectively.

Referring to FIG. 4, the radiator chamber 6, located to the right of the device installation chamber 5, contains the radiator fan 60 in its top portion, i.e., through the top face panel 29 of the package 2. The radiator 61, being rectangular in a plan view, is disposed laterally (in this example, substantially horizontally) facing the radiator fan 60 from below. The radiator fan 60 is located a little off the center (to the left) of the radiator chamber 6. To the right of the radiator fan 60 are there provided the mist separator 62 and a cooling water reserve tank 63. The mist separator 62 separates water content out of the exhaust of the engine 40.

The radiator fan 60 has a main body portion 60a containing an electric motor. The main body portion 60a is supported by the frame 20 of the package 2 via a subframe 64 so that the radiator fan 60 has its rotating shaft oriented vertically. The radiator 61, disposed to face the radiator fan 60 from below, is located off the center (to the right) of the radiator chamber 6, so that the middle portion of the core 61a of the radiator 61 is displaced to the right with respect to the rotating shaft line of the radiator fan 60.

A water supply pipe 45a and a waste water pipe 45b, which are components of the cooling water circuit 45, are disposed to the left of the radiator 61 located in the right-hand side of the radiator chamber 6 and are connected to respective tubes 61b of the radiator 61. Each tube 61b is folded over in the left/right direction inside the core 61a of the radiator 61 and has an end thereof connected to the water supply pipe 45a and the other end thereof connected to the waste water pipe 45b.

Heated cooling water flows into the tubes 61b via the water supply pipe 45a, and while passing through the tubes 61b in the core 61a of the radiator 61, exchanges heat with the air passing vertically through the core 61a (radiator ventilation air) to discharge heat. The cooling water, now cooled down as a result of the heat discharge, flows out of the tubes 61b into the waste water pipe 45b and returns to the water jacket of the engine 40 through the cooling water circuit 45.

The radiator 61 is separated from the underlying midlevel wall 34 by as much as the height of the radiator vents 21a, 23a, and 25a opened respectively in the front, right, and rear faces of the package 2, in order to allow the passage of the radiator ventilation air. This structure introduces outside air via the three radiator vents 21a, 23a, and 25a into an outside air introducing space formed below the radiator 61 and subsequently passes the outside air through the core 61a upward from below.

To support the radiator 61 above the midlevel wall 34 at a distance equal to the height of the radiator vents 21a, 23a, and 25a in this manner, the radiator 61 has a right frame portion thereof supported at its two front and rear corners by the frame 20 of the package 2. Meanwhile, the left frame portion 61c of the radiator 61 is supported by a spatial connection port cover 65 that covers a spatial connection port 34a in the midlevel wall 34 from above.

More specifically, the spatial connection port 34a is opened substantially through the central portion of the midlevel wall 34 with respect to the left/right direction (in this example, a little to the right of the central portion), so that the opening is formed vertically through the midlevel wall 34, spatially connecting the bottom compartment 4 to the radiator chamber 6. The spatial connection port cover 65 is disposed so as to cover the spatial connection port 34a from above. The spatial connection port cover 65 guides the engine ventilation air that flows in from the bottom compartment 4 through the spatial connection port 34a to the space that is to the left of the radiator chamber 6.

External Battery Unit

Next, the structure of the power failure response enabled device in accordance with the present embodiment will be described in reference to FIGS. 5 and 6, as well as to FIGS. 1 to 4. As mentioned above in reference to FIG. 1, the power failure response enabled device includes the external battery unit 7 attached to the lower panel 24 on the package's right face. The lower panel 24 of the power failure response enabled device therefore has a different structure from that of the aforementioned standard device. There are however only a small number of differences between them, and the lower panel of the power failure response enabled device is denoted by the same reference numeral "24" as that of the standard device.

Figure 5:
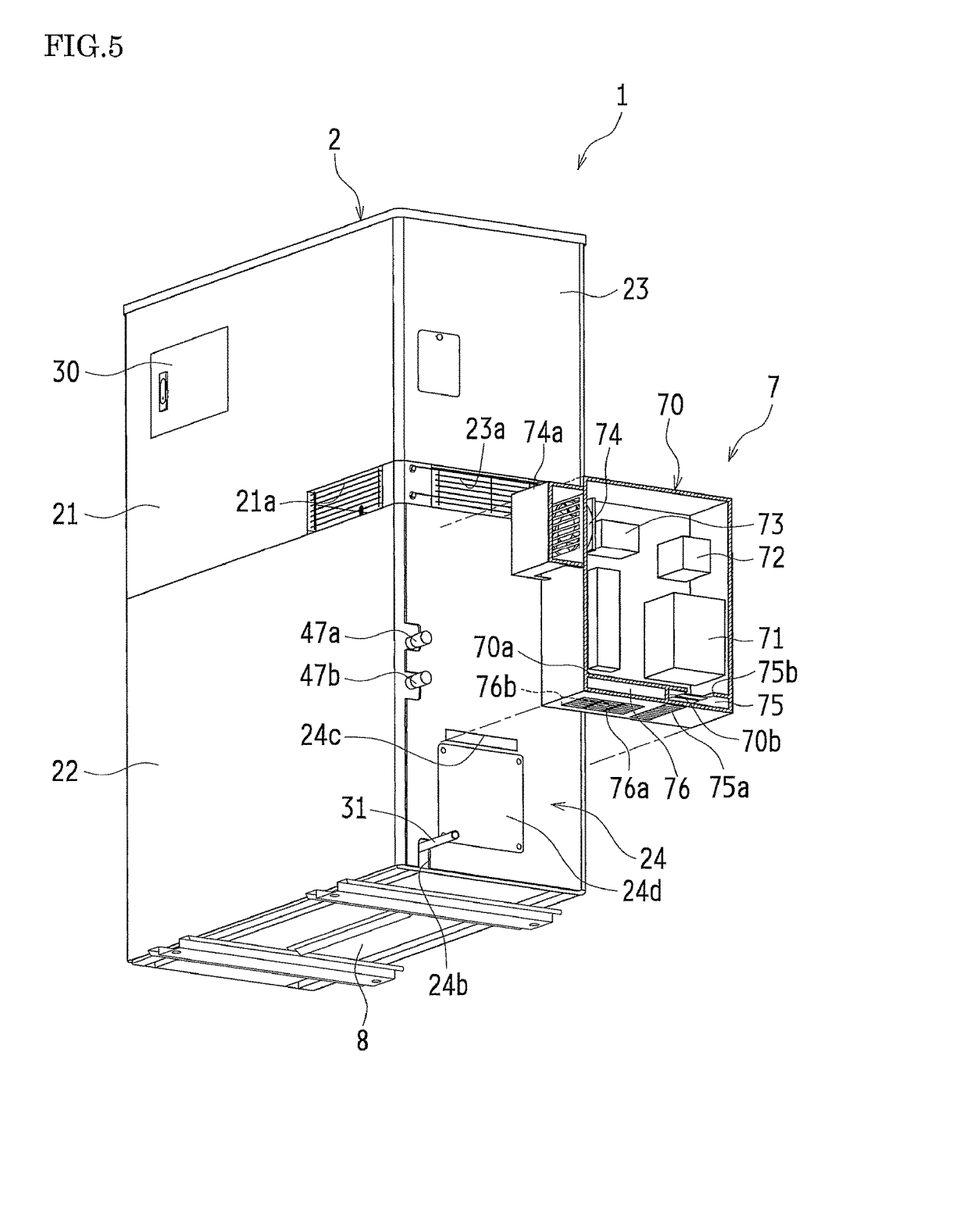
FIG. 5 is an exploded perspective view of a power failure response enabled device as viewed obliquely upward from the front, illustrating some parts of a battery unit in cross-sections.
Figure 6:
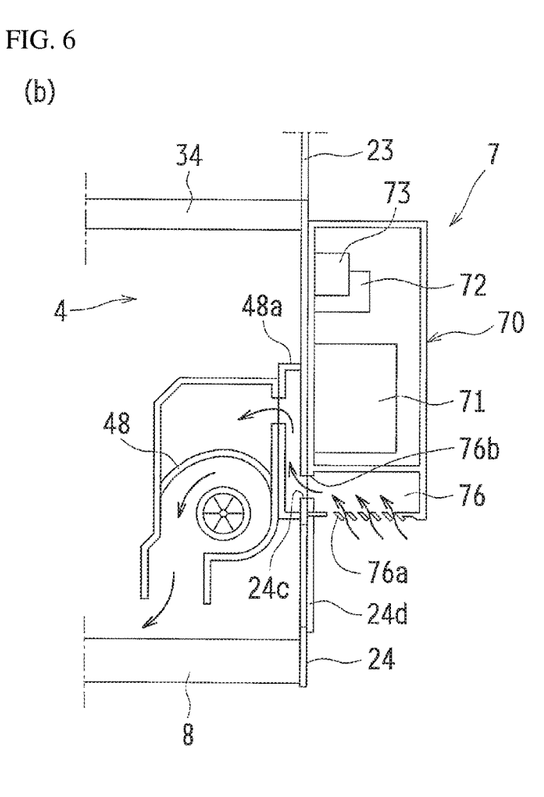
FIG. 6(a) and FIG. 6(b) are schematic diagrams depicting an air flow in a unit ventilating section and a package ventilating section as viewed from the right-hand side of the package and from the front of the package respectively.

More specifically, referring to FIG. 5, the engine ventilation gallery 24a of the standard device is replaced, in the power failure response enabled device, by a laterally elongated engine vent (vent) 24c and a substantially square bottom compartment inspection window 24d that are provided in the lower panel 24 on the package's right face (external wall panel of the bottom compartment 4). The engine vent 24c is provided in an area covered by the battery unit 7. The bottom compartment inspection window 24d is provided below the battery unit 7 so that it can be detached.

Except for the engine vent 24c and the bottom compartment inspection window 24d, the lower panel 24 of the power failure response enabled device has the same structure as that of the standard device. For example, a notch section 24b through which the drain hose 31 is run is cut out on the bottom end of the lower panel 24, close to the front. The water supply tube 47a and the waste water tube 47b extend through the lower panel 24 and project out of the package 2.

The battery unit 7, attached externally to the lower panel 24, houses for example, a battery 71, a battery-chargeable charger 72, and an inverter 73 in an enclosure 70 shaped like a rectangular parallelepiped. FIG. 5 illustrates some members in the enclosure 70 in cross-sections. The battery 71 supplies electric power to a starter motor 40a (see FIG. 4) to start an engine in case of a power failure. The charger 72 converts the electric power output of the commercial electric power system from AC to DC during the normal operation of the commercial electric power system to supply the DC to the battery 71. The inverter 73 converts the output of battery 71 from DC to AC during a power failure to supply the AC to the circuit boards 51 to 53.

There is provided a dedicated unit ventilation fan 74 on an upper part of the front wall of the enclosure 70 (left-hand sidewall in FIG. 5). The unit ventilation fan 74 draws air out of the enclosure 70. Outside air is introduced into the enclosure 70 by the rotation of the unit ventilation fan 74 through a unit ventilating section 75 in a manner detailed later. A fan cover 74a is attached to the front wall of the enclosure 70 to cover the front of the unit ventilation fan 74. The fan cover 74a has an open bottom.

The lower part of the enclosure 70 is divided into the unit ventilating section 75 and a package ventilating section 76 that ventilates the bottom compartment 4 of the package 2. More specifically, underneath the storage space where the battery 71, the charger 72, etc. are contained, a partition wall 70a forms a lower compartment that is flattened in the up/down direction. This lower compartment is further divided by a partition wall 70b into the package ventilating section 76 on the front and the unit ventilating section 75 on the rear.

As indicated schematically by open arrows in FIG. 6(a), outside air flows into the unit ventilating section 75 through a gallery 75a provided on the bottom wall of the enclosure 70 and introduced to the storage space through an opening 75b provided in the partition wall 70a above the gallery 75a. The gallery 75a and the opening 75b above it are not aligned in the front/rear direction (in the left/right direction in FIG. 6(a)). The non-aligned positioning forms a trap that separates, for example, rain water and dust out of the outside air introduced to the storage space as described above.

As illustrated in FIG. 6(a), the outside air out of which rain water, dust, etc. have been separated flows into the storage space through the opening 75b and efficiently cools the battery 71 located immediately above the opening 75b. Thereafter, the air flow is curved toward the front (toward the left-hand side in FIG. 6(a)) as it is drawn by the unit ventilation fan 74. Being located on this air flow path, the charger 72, the inverter 73, etc. are also cooled efficiently.

Meanwhile, outside air is introduced into the package ventilating section 76 through a gallery (outside air inlet) 76a provided on the bottom wall of the enclosure 70 and blown out through an opening (outside air outlet) 76b provided in the left wall (rear wall in FIG. 5) of the enclosure 70. This opening 76b is spatially continuous with the engine vent 24c opened in the lower panel 24 on the package's right face. Therefore, the bottom compartment 4 of the package 2 is supplied with outside air via the package ventilating section 76 of the battery unit 7 as will be detailed next.

The following description will focus on air flows inside the package 2 of the cogeneration device (power failure response enabled device) 1 in accordance with the present embodiment, especially, on an air flow (engine ventilation air) to the bottom compartment 4 via the package ventilating section 76 of the battery unit 7.

In the cogeneration device 1 in accordance with the present embodiment, ambient temperature in the bottom compartment 4 rises due to the operation of the engine 40, the electric power generator 41, etc. In response to this temperature rise, the air intake fan 48 operates to draw outside air through an air intake duct 48a, which generates negative pressure in the air intake duct 48a. The negative pressure causes outside air to flow into the air intake duct 48a through the package ventilating section 76 of the battery unit 7 as indicated schematically by solid-line arrows in FIG. 6(b).

More specifically, as mentioned above, outside air is introduced into the package ventilating section 76 through the gallery 76a on the bottom wall of the enclosure 70. The package ventilating section 76 then blows out the outside air through the opening 76b in the left wall. The outside air blown out in this manner flows into the air intake duct 48a through the engine vent 24c that is spatially continuous with the opening 76b and is drawn into the air intake fan 48 and blown at the bottom of the bottom compartment 4 by the air intake fan 48 as engine ventilation air.

The engine ventilation air (not shown) blown out of the air intake fan 48 in this manner ascends while drawing heat from the engine 40, the electric power generator 41, etc. in the bottom compartment 4 and flows through the spatial connection port 34a in the midlevel wall 34 into the overlying radiator chamber 6. The engine ventilation air, after merging with the air (radiator ventilation air) flowing upward through the radiator 61, is drawn into the overlying radiator fan 60 and discharged to the space above the package 2.

Maintenance of Drain Water Filter

Next will be described the maintenance of the drain water filter 49 in the power failure response enabled device that includes the battery unit 7 attached outside the package 2 as mentioned above.

Figure 7:
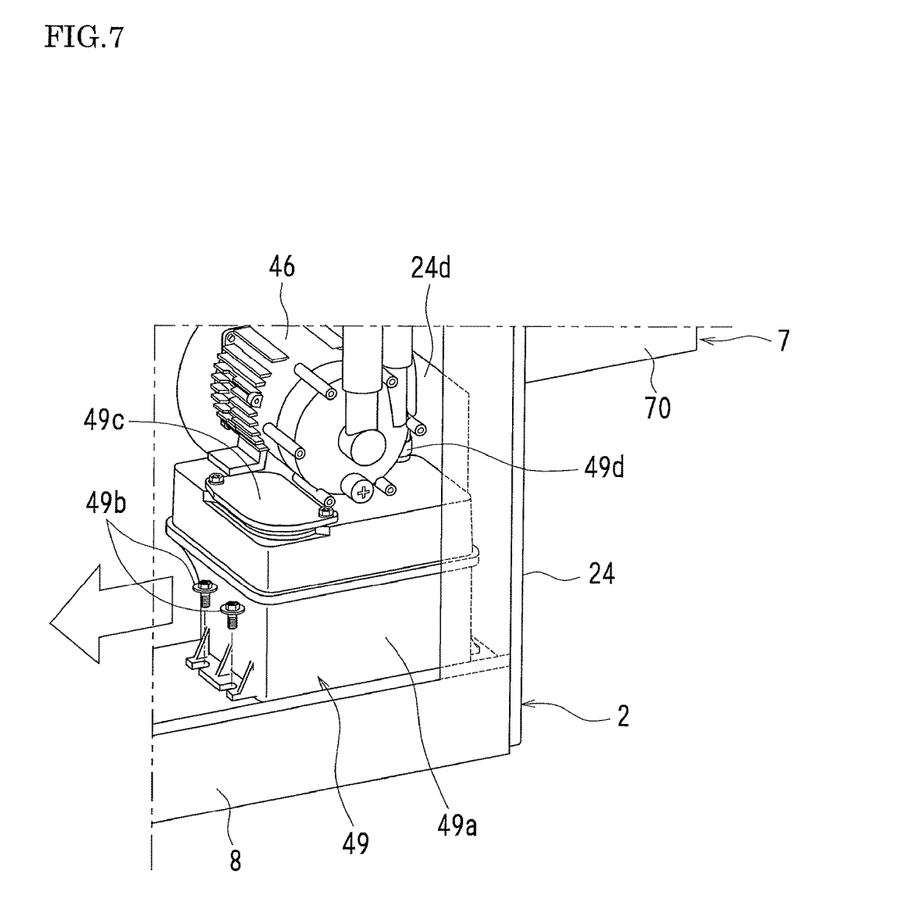
FIG. 7 is an illustration of maintenance work being performed on a drain water filter.

In the present embodiment, as mentioned earlier in reference to FIG. 4, the drain water filter 49 is disposed in the right-hand side of the bottom compartment 4 of the package 2, close to its front lower part, near the bottom compartment inspection window 24d provided in the lower panel 24 on the package's right face. As shown in FIG. 7, as well as in FIG. 4, the drain water filter 49 contains a neutralizing agent in a filter housing 49a to neutralize acid drain water.

The filter housing 49a has a box-shaped main body portion and a lid member and is fixed to the base 8 of the package 2 by a total of four bolts 49b, two on the left and two on the right. The main body portion has an open top and is capped by the lid member. Note that FIG. 4 shows two right bolts 49b in place and that FIG. 7 shows two left bolts 49b removed from place. The top face of the filter housing 49a has thereon a lid section 49c that can be opened/closed. A lower end of a drain water recovering tube 49d is connected to the top face of the filter housing 49a.

The drain water filter 49 is connected via the drain water recovering tube 49d to the overlying mist separator 62 where drain water separates from the exhaust of the engine 40 and flows downward in the drain water recovering tube 49d. Because the drain water thus recovered is acidic, the drain water filter 49 contains a neutralizing agent, such as calcite.

The neutralizing agent for neutralizing the drain water in this manner needs to be regularly supplemented or replaced. Accordingly, in the present embodiment, the drain water filter 49 is located near the bottom compartment inspection window 24d provided in the lower panel 24 on the package's right face, as described above, so that maintenance work can be performed easily by removing the bottom compartment inspection window 24d.

Specifically, to perform maintenance work on the drain water filter 49, after the lower panel 22 on the package's front face is removed, the left bolts 49b are first loosened and removed from the filter housing 49a as illustrated in FIG. 7. Next, on the package's right face, only the bottom compartment inspection window 24d is removed, without removing the lower panel 24 onto which the battery unit 7 is externally attached. Then, the right bolts 49b are loosened and removed from the filter housing 49a.

Once all the bolts 49b that fix the filter housing 49a are loosened and removed in this manner, the filter housing 49a can slide to the left as indicated by an open arrow in FIG. 7. Thus, the lid section 49c on the top face of the filter housing 49a can be readily opened to supplement the neutralizing agent.

As mentioned above, in the cogeneration device 1 in accordance with the present embodiment, first of all, the structure in which the battery unit 7 is attached outside the package 2 of the power failure response enabled device leaves no wasted battery space in the package 2 of the standard, power failure response disabled device, allowing for reduction in size of the package.

Furthermore, although the external provision of the battery unit 7 does not allow the battery 71 to be cooled by a fan or like device disposed inside the package 2, the battery 71 can be cooled in a suitable manner because the battery unit 7 contains the dedicated unit ventilation fan 74 and the unit ventilating section 75 so that outside air can be introduced into the enclosure 70.

In addition, although the battery unit 7 attached outside the package 2 may cover a part of the lower panel 24 on the package's right face, the engine vent 24c may be provided in an area covered by the battery unit 7 as described above because ventilation air can be supplied via the package ventilating section 76 provided in the battery unit 7. The structure does not constrain freedom in designing ventilation paths inside the package 2.

The detachable bottom compartment inspection window 24d, provided in the lower panel 24 below the battery unit 7, enables maintenance work on the drain water filter 49 without removing the heavy battery unit 7, which facilitates the work.

The present invention is by no means limited to the embodiments described above. For example, the battery unit 7, in the embodiment, is attached externally on the right face of the package 2. This is by no means intended to be limiting the invention. Alternatively, the battery unit 7 may be disposed on any of the left, front, and rear faces of the package 2.

In the embodiment, it is the drain water filter 49 that is disposed in the bottom compartment 4 of the package 2 near the bottom compartment inspection window 24d provided in the lower panel 24 on the package's right face. This is again by no means intended to be limiting the invention. Alternatively, another device that needs to undergo regular maintenance work may be disposed near the bottom compartment inspection window 24d.

The specific configuration of the top compartment 3 and the bottom compartment 4 inside the package 2 is not limited to the examples described in the embodiment. Alternatively, for example, the bottom compartment 4 of the package 2 may be further divided to accommodate an intake air/exhaust chamber and a device installation chamber as well as the engine chamber.

The present invention may be applied to a GHP (gas heat pump) that includes a compressor in a refrigerating circuit as a work machine powered by an engine.

The present invention is by no means limited to the embodiments described above and may be implemented in various other forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The invention claimed is:

1. An engine system comprising:
a single package having an internal space thereof divided into a top compartment and a bottom compartment, the internal space containing a work machine,
the top compartment containing a radiator chamber accommodating a radiator and a radiator fan,
the bottom compartment containing an engine,
the bottom compartment having an external wall panel onto which a battery unit housing a battery and a charger is attached outside the package,
the battery unit including a dedicated ventilation fan and a unit ventilating section configured to introduce outside air into an enclosure of the battery unit through a first outside air inlet and a first outside air outlet when the dedicated ventilation fan operates,
the enclosure having a lower portion thereof divided to accommodate a package ventilating section configured to ventilate the bottom compartment of the package,
the package ventilating section configured to introduce outside air through a second outside air inlet provided in a bottom face of the enclosure and pass the outside air through a second outside air outlet provided in a side face of the enclosure, to deliver the outside air to the bottom compartment through a vent opening provided in the external wall panel,
wherein:
a first air flow path includes the first outside air inlet and the first outside air outlet, the first air flow path is configured to enable air outside the package into the enclosure and output the air from the enclosure to an environment outside of the package, and
a second air flow path distinct from the first air flow path includes the second outside air inlet, the second outside air outlet, and the vent opening, and there being provided a detachable bottom compartment inspection window in the external wall panel below the battery unit, wherein the enclosure of the battery unit houses the battery, the charger, the dedicated ventilation fan and the unit ventilating section, and is attached to the external wall panel on an outer side of the package.

2. The engine system as set forth in claim 1, wherein the bottom compartment of the package contains a drain water filter for engine exhaust gas near the bottom compartment inspection window.

3. The engine system as set forth in claim 1, wherein the external wall panel of the bottom compartment is on the same plane as an external wall panel of the top compartment along the same face of the package.

4. The engine system as set forth in claim 1, wherein the package is a rectangular box with faces formed of a plurality of external wall panels, one of which has the battery unit attached thereto.

5. The engine system as set forth in claim 4, wherein each of the side faces of the rectangular box is divided into two external wall panels from the plurality of external wall panels, one of the two external wall panels is a face of the top compartment, and the other of the two external wall panels is a face of the bottom compartment.

6. The engine system as set forth in claim 1, wherein the package further includes a frame and a plurality of external wall panels attached to the frame to form a front face, right face, left face, and rear face of the package, one of the plurality of external wall panels having the battery unit attached thereto.

7. The engine system as set forth in claim 6, wherein the external wall panel, which is attached to the battery unit, is detachably connected to the frame.

8. The engine system as set forth in claim 1, wherein the battery unit housing the battery and the charger is directly attached to the external wall panel of the bottom compartment.

9. The engine system as set forth in claim 1, wherein the dedicated ventilation fan is configured to draw air out of the enclosure of the battery unit.

10. The engine system as set forth in claim 1, wherein, in the enclosure of the battery unit, the unit ventilating section is separate from the package ventilating section.

11. An engine system comprising:
a single package comprising a plurality of external wall panels that define an internal space, the internal space divided into a top compartment associated with a radiator chamber and a bottom compartment, the plurality of external wall panels including an external wall panel that corresponds to the bottom compartment, the external wall panel having defined therein a vent opening;

an engine positioned within the bottom compartment;

a work machine positioned within the internal space;

a radiator and a radiator fan positioned within the top compartment;

an enclosure having multiple faces including a bottom face and a side face, the enclosure coupled to an outside surface of the external wall panel via the side face, the bottom face having a first outside air inlet and a second outside air inlet defined therein, the enclosure having a first air outlet defined on a face of the enclosure other than the side face, and the side face having second air outlet defined therein;

wherein:
a first air flow path includes the first outside air inlet, the first air outlet, and the vent opening; and
a second air flow path distinct from the first air flow path includes the second outside air inlet and the second air outlet, the second air flow path is configured to enable air outside the package into the enclosure and to output the air from the enclosure to an environment outside of the package; and a battery, a charger, and a battery unit ventilation fan positioned within the enclosure and located in the second air flow path.

12. The engine system of claim 11, wherein:
the first air flow path is configured to enable air outside the package to be provided to the bottom compartment from a first portion of the enclosure; and
the second air flow path is configured to enable air outside the package to be provided to a second portion of the enclosure, the second portion of the enclosure distinct from the first portion of the enclosure.

13. The engine system of claim 11, wherein:
the external wall panel having an inspection opening defined therein; and
the battery unit ventilation fan is positioned above the inspection opening.

14. The engine system of claim 13, further comprising:
a detachable bottom compartment inspection window configured to cover the inspection opening and, when detached, to enable access to the internal space via the inspection opening.

\* \* \* \* \*